United States Patent [19]
Anderson

[11] Patent Number: 4,940,625
[45] Date of Patent: Jul. 10, 1990

[54] PROCESS FOR PRINTING CONTINUOUS STRIPE AND PRODUCT THEREOF

[76] Inventor: Robert S. Anderson, Adams Rd., P.O. Box 260, Summitsville, N.Y. 12781

[21] Appl. No.: 311,639

[22] Filed: Feb. 16, 1989

[51] Int. Cl.[5] .......... B32B 3/00
[52] U.S. Cl. .......... 428/195; 428/57; 428/58; 428/78; 428/126; 428/157; 428/904.4
[58] Field of Search .......... 428/57, 58, 195, 78, 428/904.4; 156/157; 101/126

[56] References Cited

U.S. PATENT DOCUMENTS 1,457,369 6/1923 Jarvis .......... 101/126
1,494,798 5/1924 Odajian .......... 101/126
2,438,639 3/1948 Lawrence .......... 101/126
2,452,339 10/1948 Uhlig .......... 101/126

*Primary Examiner*—Ellis P. Robinson
*Assistant Examiner*—J. Weddington
*Attorney, Agent, or Firm*—Amster, Rothstein & Ebenstein

[57] ABSTRACT

An image-impressing device impresses on an axially elongate substrate surface by flat-bed table-top printing an apparently continuous major stripe of constant width and straight edges in excess of the length of the image-impressing device by repeatedly moving the image-impressing device to successive slightly overlapping and generally longitudinally aligned lengths of the substrate surface to form a longitudinally continuous plurality of minor stripes of generally constant width and generally straight edges not in excess of the length of the image-impressing device. Each of the minor stripes is formed with at least one inwardly tapered end overlapping the end of an adjacent minor stripe to enhance the illusion of a continuous major stripe of constant width and straight edges by enhancing the apparent longitudinal alignment of the overlapping ends.

12 Claims, 4 Drawing Sheets

PROCESS FOR PRINTING CONTINUOUS STRIPE AND PRODUCT THEREOF

BACKGROUND OF THE INVENTION

The present invention relates to a method of printing an apparently continuous stripe of constant width and straight edges, and more particularly to a method for printing the same using a movable flat-bed table-top image-impressing devices such as a silk screen.

For the purposes of the following specification and claims, the short stripe (or longitudinal section of a longer stripe) laid down by an image-impressing device in a single position is referred to as a "minor" stripe, and the full-length stripe comprised of a plurality of minor stripes in generally longitudinally alignment is referred to as a "major" stripe.

A preferred method of printing a stripe on an elongated substrate, such as a length of wallpaper or textile goods, is to lay a length of the substrate out on the top of a long table and then move a movable flat-bed image-impressing device, such as a silk screen, over the substrate length. The image-impressing device is first placed on one length of the substrate and then, after the stripe-defining image is impressed, raised and lowered onto a successive length of the substrate, the two lengths typically having their ends slightly overlapping. Each longitudinal section of the stripe laid down by the image-impressing device customarily has squared-off ends, the adjacent squared-off ends of adjacent stripe sections being disposed in slightly overlapping relationship with each other to provide the impression of a continuous stripe. For example, a typical prior art overlap was 0.0625–0.125 inch (1.6–3.1 mm). Assuming that the stripe section image on the image-impressing device is essentially a long, thin rectangle, if each impression is perfectly aligned longitudinally with respect to adjacent impressions, then an apparently continuous stripe of constant width and straight edges is formed, the apparently continuous stripe having a length greater than that of the image-impressing device.

However, if adjacent impressions are not perfectly aligned, a noticeable jog is created at the point where the end of the stripe section formed by one impression overlaps the end of the stripe section formed by the adjacent impression. Typically a noticeable jog is 1 to 2 mm (0.04 to 0.08 inch), depending on the width of the stripe. Since such jogs are commercially unacceptable, continuous stripes are usually printed by rotary printing methods.

To avoid or minimize such jogs, the printer typically relies on the use of a straight guide rail on the long table to insure that each impression is in longitudinal alignment with the adjacent impressions. For example, the frame of a silk screen may have two adjustable alignment screws longitudinally spaced along the side of the frame facing the rail. In making each impression, the printer places the screen on the long table with both screws in abutting contact with the guide rail. Thus the screws determine the alignment of the screen with respect to the guide rail against which the screws abut, and hence the screws and the guide rail together determine the alignment 9th screen in one position with respect to the screen when it is in upstream or downstream positions (i.e., used to form adjacent impressions).

Despite these mechanical aids, however, the possibility of imperfect alignment always remains. In hand printing, the printer may fail to place one or both of the screen's alignment screws in abutting contact with the guide rail. In both hand printing and flat-bed machine printing, the guide rails may deviate in places from a straight line by as much as a few millimeters. This deviation may result either from initial improper placement of the guide rail or from bending or warping of the guide rail over time. As the guide rail is typically formed of a number of different longitudinal sections in end-to-end relationship, such deviations typically occur at the joint or juncture between adjacent longitudinal sections of the rail. Any such deviation from linearity of the rail will typically result in a noticeable jog at the stripe section overlap of adjacent impressions if, on one impression, one adjusting screw of the screen touches the rail at one side of the rail section juncture and, on the adjacent impression, the other adjusting screw touches the rail at the other side of the juncture. The size of the resulting jog in the print is approximately equal to the size of the jog in the rail at the juncture between the misaligned rail sections.

Accordingly, it is an object of the present invention to provide a method of printing an apparently continuous stripe of constant width and straight edges without detectable jogs.

Another object is to provide such a method which produces an apparently continuous stripe with less apparent jogs.

A further object is to provide a substrate having an apparently continuous stripe thereon of constant width and straight edges made by such a method.

SUMMARY OF THE INVENTION

It has now been found that the above and related objects of the present invention are obtained by an improvement in the method of using an image-impressing device to impress on an axially elongate substrate surface by flat-bed table-top printing an apparently continuous major stripe of constant width and straight edges in excess of the length of the image-impressing device by repeatedly moving the image-impressing device to successive slightly overlapping and generally longitudinally aligned lengths of the substrate surface to form a longitudinally continuous plurality of minor stripes of generally constant width and generally straight edges not in excess of the length of the image-impressing device. The improvement comprises the step of forming each of the minor stripes with at least one inwardly tapered end overlapping the end of an adjacent minor stripe to enhance the illusion of a continuous major stripe of constant width and straight edges by enhancing the apparent longitudinal alignment of the overlapping ends.

In a preferred embodiment, the overlapping ends of both adjacent minor stripes are inwardly tapered, and preferably both ends of each minor stripe are inwardly tapered so that an inwardly tapered end of one minor stripe overlaps the inwardly tapered end of an adjacent minor stripe. The adjacent minor stripes are formed with the overlapping inwardly tapered ends overlapping for a substantial portion of the length of the inward tapered ends, preferably for about 2–5 inches. The taper of the inwardly tapered end does not exceed 2.0° on each side and is preferably about 1.0°–1.5°. The non-tapered portions of the minor stripes preferably, but not necessarily, have a width of at least 6 mm (0.25 inch).

The present invention further encompasses an axially elongate substrate having on a surface thereof an apparently continuous major stripe of constant width and straight edges and given length. The major stripe is defined by a plurality of successive slightly overlapping and generally longitudinally aligned minor stripes of generally constant width, generally straight edges, and shorter length. Each minor stripe has at least one inwardly tapered end overlapping the end of an adjacent minor stripe to provide the illusion of a continuous major stripe of constant width and straight edges by enhancing the apparent longitudinal alignment of the overlapping ends.

BRIEF DESCRIPTION OF THE DRAWING

The above brief description, as well as further objects and features of the present invention, will be more fully understood by reference to the following detailed description of the presently preferred, albeit illustrative, embodiments of the present invention when taken in conjunction with the accompanying drawing wherein.

The drawings are not to scale, and in particular the overlap lengths, taper angles and the like, are exaggerated for pedagogic purposes.

DETAILED DESCRIPTION OF THE PREFERRED EMBODIMENTS

Figure 1:
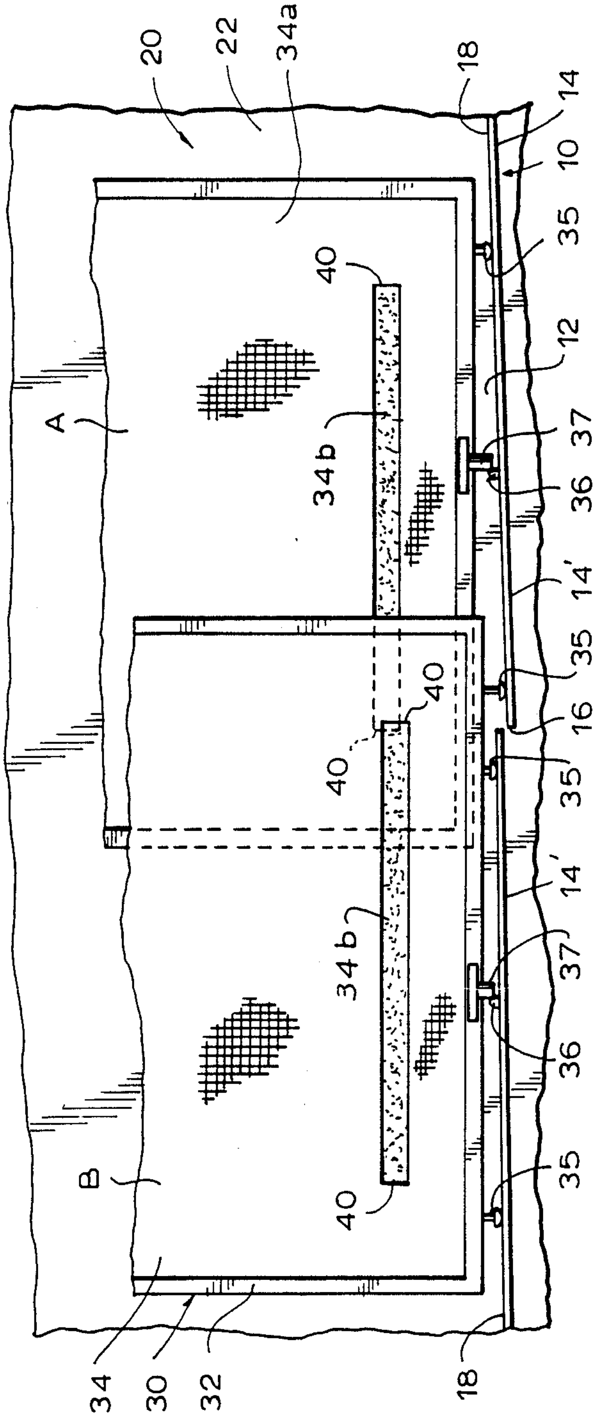
FIG. 1 PRIOR ART
FIG. 1 is a fragmentary top plan view of a silk screen for producing a major stripe of the prior art, the silk screen being shown on top of a length of wallpaper resting on a long table with misaligned guide rail sections, the silk screen being shown in two consecutive positions (position A and position B) simultaneously for purposes of exposition.

Referring now to the drawing, and in particular to FIG. 1 thereof, therein illustrated is a conventional long table generally designated by the reference numeral 10 having a substantially flat or planar top surface 12 and a guide rail 14, along one long side thereof, projecting upwardly from the top surface 12. The guide rail 14 is composed of a series of longitudinally aligned shorter guide rail sections 14' joined together at junctures 16. While every effort is made to insure that the inner surface 18 of the guide rail 14 (that is, the surface closer to the image-impressing device) is linear, frequently an individual guide rail section 14' is bent or warped out of shape or the inner surfaces 18 of adjoining guide rail sections 14' may not align exactly at the junctures 16 (as illustrated in FIG. 1).

A length of a substrate generally designated 20, having an upper surface 22, is stretched out on top surface 12 of the table 10, typically with its longitudinal axis (as customarily determined by a long edge of the substrate) parallel with the axis of guide rail 14. The substrate 20 may be wallpaper, textile goods, fabric, or like material on which the stripe image is to be printed.

A movable flat-bed image-impressing device, such as the silk screen generally designated 30, is used to impress the stripe on the upper surface 22 of the substrate 20. The actual printing operation may be performed either by hand or flat-bed machine printing, both being conventional in the art. The silk screen 30 typically is formed by a generally rectangular frame 32 and a screen portion 34 within the frame 32. The screen portion 34 is in turn comprised of ink-impermeable segments 34a which preclude ink (not shown) placed on top of the screen portion 34 from passing therethrough and onto the substrate upper surface 22, and ink-permeable segments 34b which permit the ink placed on top of the screen portion 34 to pass through the screen and form an impression on the substrate upper surface 22.

The screen frame 32 is provided with alignment screws 35, typically one adjacent each end of the side of screen frame 32 adjacent the guide rail 14. The free ends of the alignment screws 35 are designed to abut against the guide rail 14 during use of the screen 30 and to thereby maintain the longitudinal axis of screen 30 parallel to the longitudinal axis of guide rail 14 to the greatest extent possible. To this end, the alignment screws 35 are typically individually adjustable relative to the screen frame 32 so that any deviation from linearity in the screen frame 32 may be compensated for by adjustment of the effective projecting length of the alignment screw 35.

As the length of screen 30 is less than the length of the substrate 20, it is necessary for the screen 30 to be used to form one impression on a length of substrate 20 (see position A of FIG. 1), then relocated longitudinally downstream to form another identical impression on a successive length of the substrate 20 (see position B of FIG. 1), and so on, each impression being called a "repeat" because it contains a repetition of the pattern of ink-impermeable segments 34a and ink-permeable segments 34b defined by the screen portion 34 of screen 30. (Of course, each repeat may itself contain one or more repetitions of a basic design.)

To provide for appropriate placement of the screen 30 for each repeat, the guide rail 14 is provided with stops 36 longitudinally spaced apart by the length of one repeat, and the screen frame 32 is provided with a registration tee 37 extending outwardly from the screen frame 32 a distance sufficient to form abutting contact with an adjacent stop 36. At least in those instances where it is intended that the impressions should overlap slightly (as is customarily the case), the longitudinal distance between adjacent stops will be somewhat less than the full longitudinal length of the screen portion 34. For example, when it is desired to form an apparently continuous "major" stripe 38 from a plurality of "minor" stripes 39 in generally longitudinal alignment, the ends of successive impressions of minor stripes 39 are typically slightly overlapped.

Figure 2:
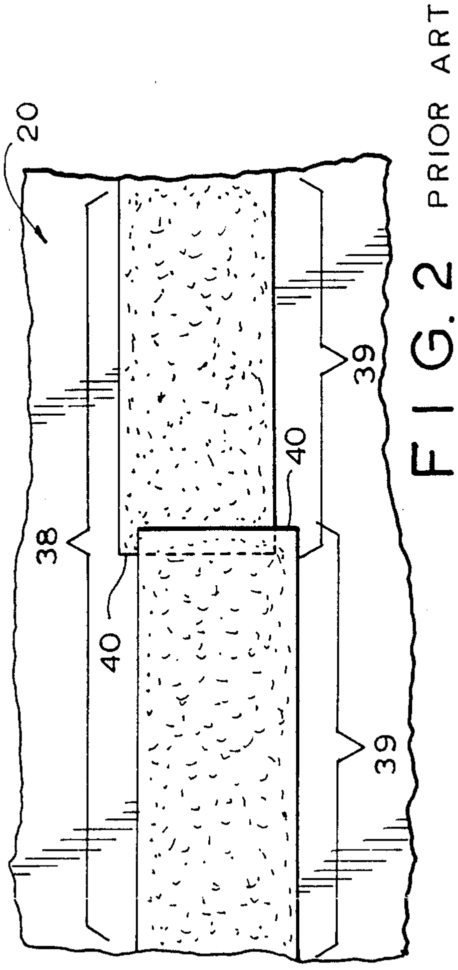
FIG. 2 PRIOR ART
FIG. 2 is a fragmentary top plan view of a major stripe of the prior art on a wallpaper, in the region of the overlap of the squared off edges of two adjacent minor stripes, as might be produced by the system of FIG. 1.

To print an apparently continuous major stripe 38 of constant width and straight edges on the substrate upper surface 22, the silk screen 30 is provided with a screen portion 34 having an ink-permeable segment 34a in the minor stripe configuration of a long thin rectangle having squared-off ends 40. Thus, if each impression is perfectly longitudinally aligned with respect to adjacent impressions, then an apparently continuous major stripe 38 of constant width and straight edges is formed. While each of the minor stripes 39 forming the single impression would be of generally constant width and generally straight edges, for a variety of reasons earlier noted, the minor stripes 39 may not be in perfect longitudinal alignment and noticeable jogs will result on the substrate 20 (as illustrated in FIG. 2) in the region of overlap of the squared-off edges of the minor stripes 39.

The apparatus and method described hereinabove being conventional in nature, no further description thereof is required.

Referring now to FIGS. 3-6, according to the present invention the prior art minor stripes 39 with square-off ends 40 (see FIGS. 1 and 2) are replaced by minor stripes 41 with inwardly tapered ends 42. As a result of this novel design for the minor stripes 41, the same problems which in the prior art resulted in a noticeable jog in the major stripe 38 in the region of minor stripe overlap (see FIG. 2) now result only in a slight swelling of the major stripe 43 in the region of the minor stripe overlap (see FIG. 6), this slight swelling being much less noticeable than an abrupt jog and indeed being almost undetectable in most instances. As a result, the present invention makes it possible to print commercially acceptable continuous stripes 43 by flat-bed printing in spite of imperfect longitudinal alignment of adjacent impressions, whether caused by minor deviations in the straightness of the guide rail 14 (or its rail segments 14') or careless printing (such as a failure to have the alignment screws 34 properly adjusted and abutting against the guide rail 14).

Figure 3:
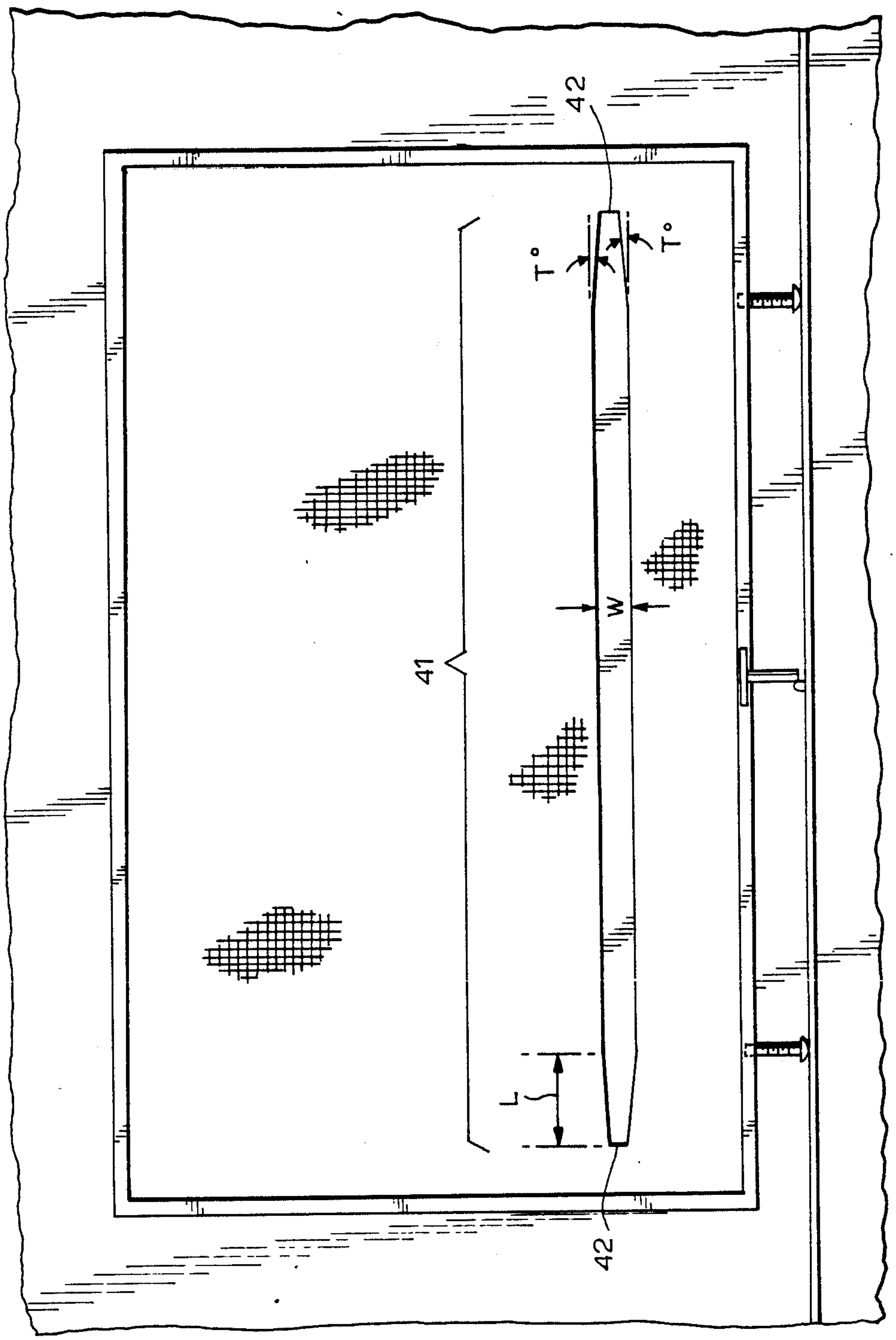
FIG. 3 is a fragmentary top plan view of a silk screen for producing a major stripe according to the present invention, the silk screen being shown on top of a length of wallpaper resting on a long table.
Figure 4:
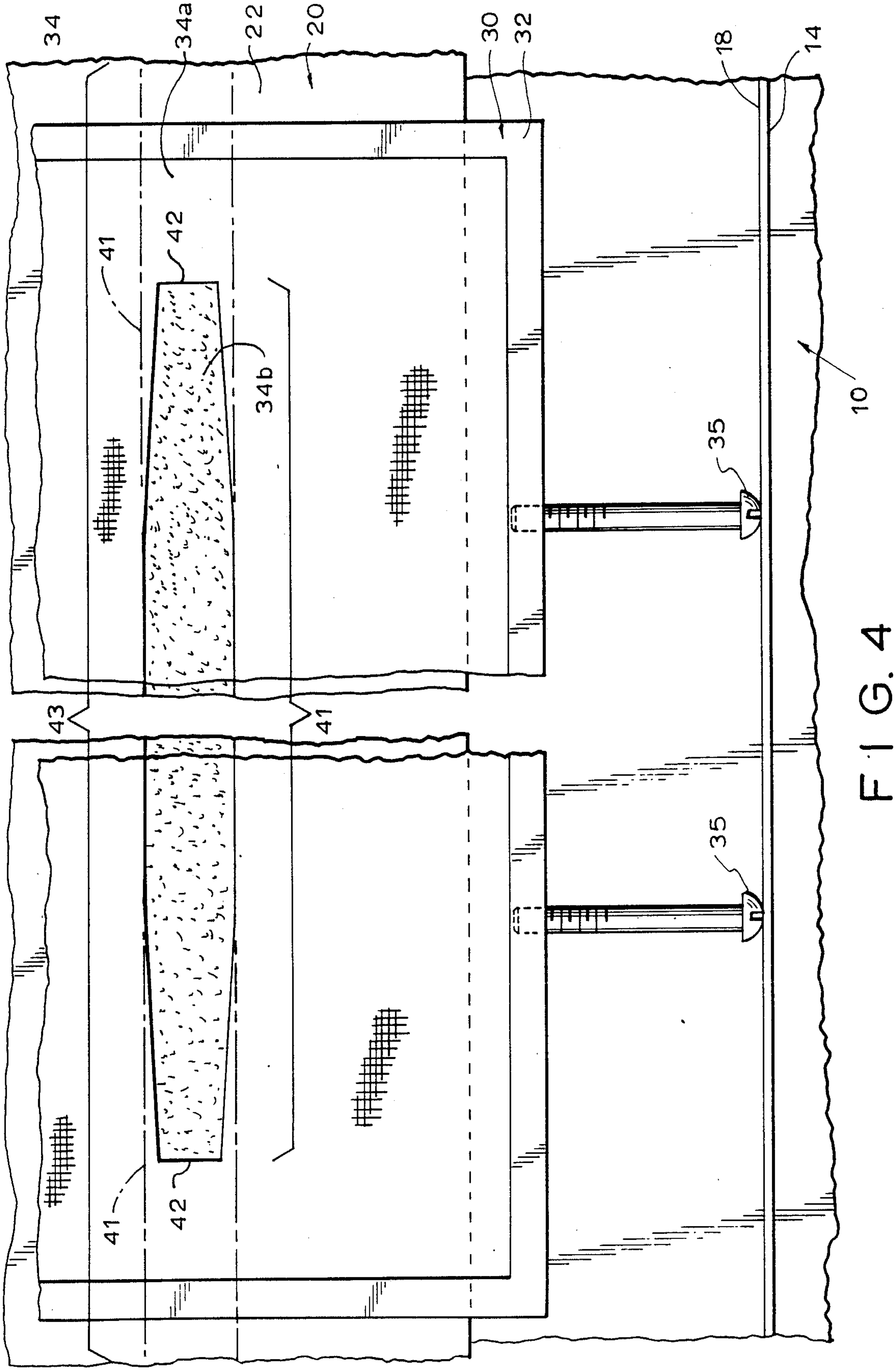
FIG. 4 is a fragmentary top plan view of the silk screen on top of a length of wallpaper resting on a long table, with the two immediately adjacent minor stripes being indicated in phantom line for purposes of exposition.

The size of the jog that can be concealed by the tapered overlap technique of the present invention depends basically on three factors, as illustrated in FIG. 3: (1) the angle T of taper, (2) the length L of the tapered overlap, and (3) the width W of the stripe.

Taper angle: The taper angle T should be small enough so that the point at which the taper starts is not obvious to the naked eye. If the angle is obvious, the stripe no longer appears to have straight edges and it is not commercially acceptable for striped wallpaper. In most cases an angle taper not in excess of 2.0 degrees, and preferably in the range of about 1.0°-1.5°, produces acceptable results. If the angle is larger than 2.0 degrees, the starting point of the taper may be obvious; if the angle is smaller than about 1 degree, the length of overlap required may be excessive. A taper of 1.3° conceals a jog of about 3 mm (0.12 inch) with a 130 mm (5 inches) overlap. There is a trade-off between angle of taper and the overlap length, as discussed in greater detail hereinbelow.

Length of tapered overlap: An overlap L of less than 50 mm (2 inches) provides little benefit under most circumstances. Where the taper is 1.3°, an overlap of 50 mm (2 inches) conceals a jog of only 1.2 mm (0.05 inch) while an overlap of 75 mm (3 inches) conceals a jog of 1.8 mm (0.07 inch).

The length of the overlap is limited in practice by the fact that the printing screen 30 must be made longer than normal to accommodate the tapered ends of the stripe. By way of example, a screen 30 for printing a stripe with a repeat of 75 (30 inches) without a tapered overlap ordinarily would have an internal frame or screen portion length of about 100 cm (40 inches). For a stripe of the same length, a tapered overlap of 7.5 cm (3 inches) would add 15 cm (6 inches) to the length of the frame, a tapered overlap of 10 cm (4 inches) would add 20 cm (8 inches), and so on, resulting in internal frame lengths of 117 cm (46 inches) and 122 cm (48 inches), respectively. Since most printers prefer not to work with screens longer than 122 cm (48 inches), an overlap of 10 cm (4 inches) is the practical maximum for a stripe screen with a 76 cm (30-inch) repeat. If the repeat is shorter, a longer overlap is feasible. On the other hand, the shorter the repeat, the more swellings may occur over a given length of substrate and the more prints or impressions are required for the same length of substrate (thus increasing printing time and printing cost). Accordingly, there is clearly a trade-off between repeat distance and length of overlap.

Width of Stripe: The tapered-overlap technique of the present invention works best with stripes having a width W of at least 6 mm (0.25 inch), and preferably stripes at least 13 mm (0.5 inch) wide. With stripes narrower than 6 mm (0.25 inch), a sizable misalignment between adjacent prints may cause a noticeable swerve in the stripe at the area of overlap. For such narrow stripes the utility of the technique of the present invention is limited to tables with straighter-than-average guide rails and to printers who take exceptional care in screen placement. The limitations imposed by narrow stripes apply whether the narrow stripes are created as positives, by actually printing them, or as negatives, in which the apparent narrow stripe is merely the ground color between printed wide stripes.

As briefly discussed above, there is a definite trade-off between the taper angle and the length of the tapered overlap relative to the size of the jog that can be concealed. For a given taPer angle, increasing the length of the overlap increases the size of the jog that can be concealed. With a taper angle of 0.1279 degrees, for example, the maximum jog that can be concealed is 1.5 mm for a 3 inch overlap, 2 mm for a 4 inch overlap, and nearly 3 mm for a 5 inch overlap. Similarly, for a given length of tapered overlap, increasing the taper angle increases the size of the jog that can be concealed. Table I shows the maximum jogs (in mm) in a printed stripe that can be concealed by tapered overlaps of 2 inches (51 mm), 3 inches (76 mm), 4 inches (102 mm), and 5 inches (129 mm) for various angles of taper (in radians and degrees).

It will be appreciated that the techniques of the present invention apply both to stripes which are created as positives (that is, by actually printing them) or as negatives (that is, by printing wide stripes and leaving the ground color between the wide stripes as apparent stripe in between).

Figure 5:
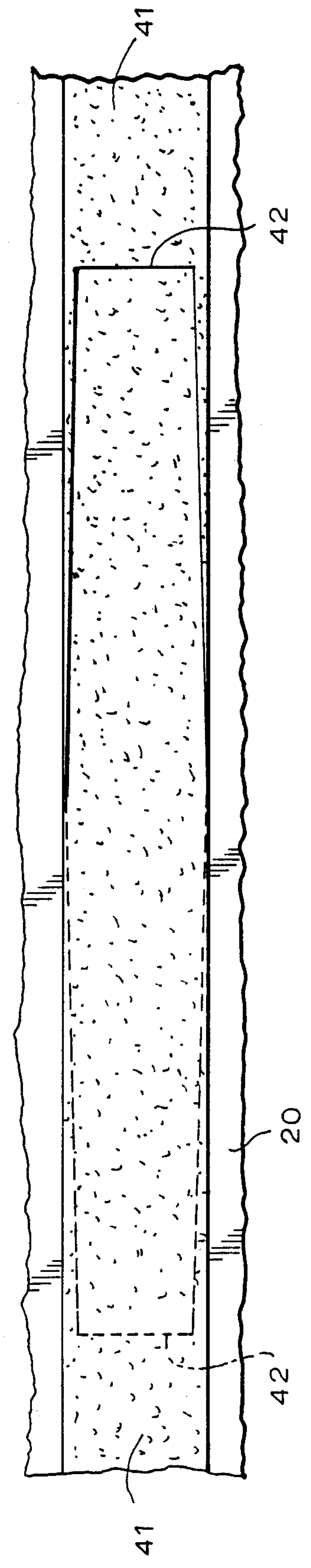
FIG. 5 is a fragmentary top plan view of a major stripe according to the present invention on a wall paper, in the region of the overlap of the tapered edges of two adjacent minor stripes, where the two adjacent minor stripes are in perfect longitudinal alignment.
Figure 6:
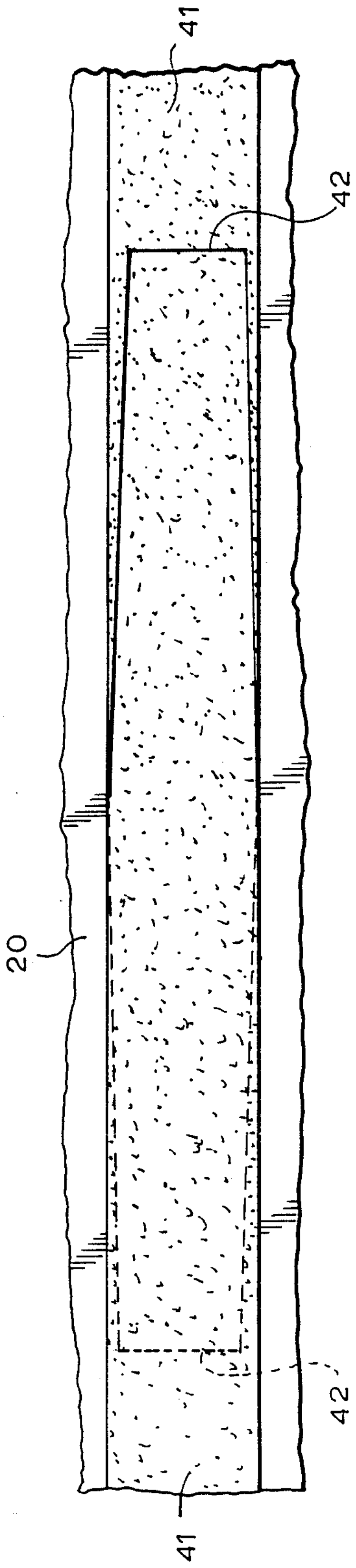
FIG. 6 is a view similar to FIG. 5 where the two adjacent minor stripes are not in perfect longitudinal alignment.

According to the present invention, the tapered end of one impression is designed to completely overlap the length of the tapered end of the adjacent impression. Where the two impressions are in perfect longitudinal alignment (as illustrated in FIG. 5), here as in the prior art, no jog (and not even a swelling) exists in the region of overlap of the minor stripes. Where the two impressions are not in strict longitudinal alignment, the jog (see FIG. 2) of the major stripe -- which would be conspicuously present according to the method of the prior art utilizing square-ended minor stripes -- is concealed and only an inconspicuous swelling (see FIG. 6) of the major stripe is present. While even such an inconspicuous swelling is not desirable, it is at least commercially acceptable for most applications, even where a well defined jog would not be acceptable.

Where the substrate is short, so that only one repeat is required, it is only necessary that the overlapping ends of the adjacent minor stripes are tapered in order to achieve the desired effect and the non-overlapping ends of these adjacent minor stripes may be square-cut, as in the prior art. While the present invention has been described in connection with an embodiment wherein the overlapping ends of both adjacent minor stripes are inwardly tapered, clearly a similar, albeit less effective concealment of the jog may be achieved with only one of the overlapping ends of two adjacent minor stripes being inwardly tapered. Furthermore, while the present invention is described in connection with an embodiment wherein the inwardly taped ends of two adjacent minor straps completely overlap, clearly a similar, albeit less effective concealment of the jog may be achieved with a less than total overlap of the inwardly tapered ends - e.g., with only portions of each inwardly tapered end overlapping.

The method of the present invention produces an elongate substrate having on a surface thereof an apparently continuous major stripe of constant width, straight edges and given length. The major stripe is defined in fact by an overlapping plurality of generally longitudinally aligned minor stripes of generally constant width, generally straight edges and shorter length than the given length of the major stripe. The desired visual effect is obtained because each of the minor stripes has at least one inwardly tapered end overlapping the end of an adjacent minor stripe to provide the illusion of a continuous major stripe of constant width and straight edges by enhancing the apparent longitudinal alignment of the overlapping ends.

To summarize, the present invention provides a method of printing apparently continuous stripes of constant width and straight edges with less apparent jogs and, in a preferred embodiment, without detectable jogs.

Now that the preferred embodiments of the present invention have been shown and described in detail, various modifications and improvements thereon will become readily apparent to those skilled in the art. Accordingly, the appended claims are to be construed broadly and in a manner consistent with the spirit and scope of the invention described herein.

TABLE I

Maximum Jogs Concealed By Various Taper Angles For Various Tapered Overlap Lengths

| | Length of tapered overlap (mm) | Max. jog hidden by taper (mm) | Taper angle (radians) | Taper angle (degrees) |
|---|---|---|---|---|
| 5-Inch tapered overlap | 129 | .50 | .00388 | .22208 |
| | 129 | 1.00 | .00775 | .44416 |
| | 129 | 1.20 | .00930 | .53299 |
| | 129 | 1.50 | .01163 | .66624 |
| | 129 | 1.60 | .01240 | .71066 |
| | 129 | 2.00 | .01550 | .88834 |
| | 129 | 2.50 | .01938 | 1.11045 |
| | 129 | 3.00 | .02326 | 1.33258 |
| | 129 | 3.50 | .02714 | 1.55473 |
| | 129 | 3.80 | .02946 | 1.68803 |
| | 129 | 4.00 | .03101 | 1.77690 |
| | 129 | 5.00 | .03877 | 2.22132 |
| | 129 | 6.00 | .04653 | 2.66588 |
| 4-Inch tapered overlap | 102 | .50 | .00492 | .28197 |
| | 102 | 1.00 | .00984 | .56394 |
| | 102 | 1.20 | .01181 | .67674 |
| | 102 | 1.50 | .01476 | .84593 |

TABLE I-continued

Maximum Jogs Concealed By Various Taper Angles For Various Tapered Overlap Lengths

| | Length of tapered overlap (mm) | Max. jog hidden by taper (mm) | Taper angle (radians) | Taper angle (degrees) |
|---|---|---|---|---|
| | 102 | 2.00 | .01969 | 1.12794 |
| | 102 | 2.50 | .02461 | 1.40998 |
| | 102 | 3.00 | .02953 | 1.69205 |
| | 102 | 3.50 | .03446 | 1.97416 |
| | 102 | 3.80 | .03741 | 2.14345 |
| | 102 | 4.00 | .03938 | 2.25632 |
| | 102 | 4.50 | .04431 | 2.53853 |
| | 102 | 4.72 | .04647 | 2.66273 |
| 3-Inch tapered overlap | 76 | .50 | .00656 | .37596 |
| | 76 | 1.00 | .01312 | .75193 |
| | 76 | 1.20 | .01575 | .90233 |
| | 76 | 1.50 | .01969 | 1.12794 |
| | 76 | 2.00 | .02625 | 1.50400 |
| | 76 | 2.26 | .02966 | 1.69957 |
| | 76 | 2.50 | .03281 | 1.88012 |
| | 76 | 3.00 | .03938 | 2.25632 |
| | 76 | 3.50 | .04595 | 2.63262 |
| | 76 | 3.54 | .04647 | 2.66273 |
| 2-Inch tapered overlap | 51 | .50 | .00984 | .56394 |
| | 51 | 1.00 | .01969 | 1.12794 |
| | 51 | 1.20 | .02362 | 1.35357 |
| | 51 | 1.50 | .02953 | 1.69205 |
| | 51 | 2.00 | .03938 | 2.25632 |
| | 51 | 2.36 | .04647 | 2.66273 |

I claim:

1. An axially elongate substrate having on a surface thereof an apparently continuous major stripe of constant width and straight edges and given length, said major stripe being defined by a plurality of successive slightly overlapping and generally longitudinally aligned minor stripes of substantially constant width, substantially straight edges, and shorter length, each said minor stripe having at least one inwardly tapered end overlapping the end of an adjacent minor stripe to provide the illusion of a continuous major stripe of constant width and straight edges by enhancing the apparent longitudinal alignment of said overlapping ends.

2. The substrate of claim 1 wherein said overlapping ends of both adjacent minor stripes are inwardly tapered.

3. The substrate of claim 2 wherein both ends of each of said minor stripes are inwardly tapered.

4. The substrate of claim 3 wherein each of said minor stripes has its inwardly tapered end overlapping the inwardly tapered end of said adjacent minor stripe.

5. The substrate of claim 1 wherein said overlapping inwardly tapered ends overlap for a substantial portion of the length of said inward tapered ends.

6. The substrate of claim 1 wherein said overlapping inwardly tapered ends overlap for about 2–5 inches.

7. The substrate of claim 1 wherein the taper of said inwardly tapered end does not exceed 2.0° on each side.

8. The substrate of claim 7 wherein the taper is about 1.0–1.5°.

9. The substrate of claim 1 wherein said minor stripes intermediate the tapered ends have a width of 0.25 inch.

10. The substrate of claim 9 wherein said minor stripes intermediate the tapered ends have a width of 0.5 inch.

11. An axially elongate substrate having an apparently continuous major stripe of constant width, straight edges and given length on a surface thereof, said major stripe being defined by a plurality of successive slightly overlapping and substantially longitudinally, aligned minor stripes of substantially constant width, substantially straight edges and shorter length, each said minor stripe having both ends inwardly tapered and overlapping the inwardly tapered ends of adjacent minor stripes, said overlapping inwardly tapered ends having an inward taper not exceeding 2.0° on each side and overlapping for a substantial portion of the length of said inward tapered end, thereby to provide the illusion of a continuous major stripe of constant width and straight edges by enhancing the apparent longitudinal alignment of said overlapping ends.

12. The substrate of claim 11 wherein said minor stripes intermediate said tapered ends have a width of at least 0.25 inch and said overlapping inwardly tapered ends have an inward taper of about 1.0°–1.5° and overlap for about 2–5 inches.

* * * * *